Patented Jan. 29, 1952

2,583,606

UNITED STATES PATENT OFFICE 2,583,606

SILICA BASE LUBRICATING GREASES

Aurelio F. Sirianni and Ira E. Puddington, Ottawa, Ontario, Canada, assignors to The Honorary Advisory Council for Scientific and Industrial Research, Ottawa, Ontario, Canada, a body corporate of Canada No Drawing. Application December 18, 1948, Serial No. 66,133

2 Claims. (Cl. 252—28)

The present invention relates to silica base lubricating greases and is particularly concerned with the waterproofing of such greases. Compositions of this type, wherein a silica gel has its normal water content replaced by a lubricating oil, have a preferential affinity for water and this invention is concerned with destroying such affinity in order to prevent replacement of lubricating oil with water and the consequent oil separation which renders such greases useless for lubricating purposes.

In our application Serial No. 66,130, filed December 18, 1948, there is disclosed a lubricating grease thickened with an inorganic base gel, that is, a thickened mineral oil grease wherein the grease structure is established by means of thixotropic or gel-forming material such as silica gel instead of using conventional metal soap thickener. The grease is prepared by replacing the original water content of the silica gel by a suitable lubricating oil, this being accomplished for example by the use of a mutual solvent which first replaces the water and is later replaced by the oil.

The particular method which is followed to produce the silica base grease per se forms no part of the present invention. As described in the aforesaid application, the gel is treated to remove its normal water without collapse of the gel structure, e. g., the water in the silica gel may first be replaced by a mutual solvent such as acetone, the acetone may next be replaced by a light hydrocarbon, and the light hydrocarbon may be replaced eventually by an oil of appropriate lubricating grade. Other mutual solvents such as pyridine or various alcohols, may be used in lieu of acetone in an analogous manner to obtain the same result, or commercial areogels which retain their gel structure may be used directly, in which case the use of a mutual solvent may not be required. The finished product is a colloidal gel of the same general consistency as ordinary soap-thickened greases. Because of the absence of soap, the grease so produced has unusual properties of high-temperature stability and oxidation resistance.

Although the general method of producing colloidal grease-like materials is known in the prior art, as described above, most of the products of the prior art have been quite unsatisfactory because the silica gel has a greater affinity for water than for oil. The same is true of ferric hydroxide and also of organic swelling agents such as cellulose, precipitated viscose, and the like. Hence, when oil thickened with silica gel, or one of these other materials, comes into contact with water for an appreciable period of time, the oil is displaced by the water and gradually separates from the gel. Therefore, the grease breaks down rather rapidly on contact with water. It is not always necessary to destroy the grease structure, that liquid water be present inasmuch as the normal moisture content of the air may be sufficient under some conditions to cause breakdown of the grease.

As suggested in the copending application of the present inventors, referred to above, such breakdown may be prevented by appropriately waterproofing the gel. Care must be taken, however, to select appropriate waterproofing agents which are essentially oil insoluble as well as waterproof in the grease. The waterproofing agent is added to prevent replacement of the oil in the gel (or grease) by water but it must not interfere with the replacement of water in the gel by the oil. It is, therefore, an object of the present invention to waterproof greases of the type referred to above without interfering with the formation of a suitable grease structure.

According to the present invention, it has been found that silica base greases containing mineral lubricating oils may be rendered water resistant to a very satisfactory degree by the use of small quantities of silicone type resins and resin-like materials. Resins of the silicone type such as those derived from certain amino silanes, such as alkoxy amino-silane, e. g., di-tertiary butoxy amino-silane, or from alkyl silicon chlorides, in quantities up to 3 or 4% by weight, based on the total grease, have been found quite satisfactory.

Although it has been found that these waterproofing materials when used alone, tend to reduce yield values, that is to require a larger amount of silica gel for a given consistency of grease than is required when they are not used. According to the present invention, it has been discovered further that this loss in yield may be overcome, and in many cases an even higher yield value than normal may be obtained by the addition of small amounts of water, for example 0.1 to 3.0%. The amount of water preferred is from about 0.25 to not more than about 2% but quantities somewhat smaller or larger may be employed with some advantage.

In the case of greases which are waterproofed with amino silanes, quantities of the amino silanes from about 10% to about 100%, based on the dry weight of the gel, are preferred. The amino-silanes mentioned above may be readily dispersed in lubricating oils and are preferably added prior to incorporation of the silica. Better results are obtained if the finished grease is heated, for example, baked to a temperature slightly above the boiling point of water, e. g., about 105° C. for a suitable period, for example, about an hour. This baking appears to stabilize the waterproofing resins.

The siloxane R₂SiO is polymerized readily into the silicone polymer. In each of the above, R is methyl, propyl or butyl.

In lieu of amino-silanes, various silicanes may be used to accomplish the same results, the dialkyl-silicane diols being preferred because they form multi-dimensional polymers rather than mere linear polymers. The silicanes are non-polar, and milling is desirable to obtain proper dispersion. The chemistry of all these organo-silicon polymers is well known in the art, being well summarized by Rochow "Chemistry of the Silicones" (Wiley and Sons, 1946) pages 46, 51, 54 and 62 to 65. In general the amino and halogen groups are eliminated, the polymers assuming the general structures

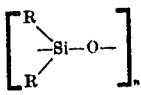

where R is alkyl or alkoxy.

The same results may be obtained by using alkyl silicon chlorides, especially the dialkyl silicon dichlorides, such as the methyl silicon chlorides of a type known commercially as "drifilm." These react by hydrolysis in a similar manner according to the general formula,

Dehydrating the R₂Si(OH)₂ forms the oxide R₂Si=O which forms the silicone polymer as above. The monoalkyl and the trialkyl compounds are also useful, so long as polymers of waterproofing properties and of approximately monomolecular thickness are applied to the gel. The polymer may be of any appropriate molecular weight so long as it forms a water-repellent film.

Example 1

A grease was prepared consisting of 89 grams of oil of a viscosity of about 300 S. S. U. at 100° F. 95 V. I., 10 grams of silica aerogel, and one gram of an alkoxy amino-silane manufactured by the Minnesota Mining and Manufacturing Company under the tradename, "R. D. 611." In this example the amino silane was dissolved in the oil at 60° C. and the silica gel was then incorporated into the oil solution and the whole mixture was passed through a colloid mill. After reating for one hour at a temperature of 105° C., the resulting grease was found to be very resistant to water.

Example 2

A grease of the same general type as in Example 1 is prepared by first fuming silica aerogel with alkyl silicon chloride, for example, dimethyl silicon dichloride, prior to incorporating the gel into lubricating oil. The dimethyl silicon dichloride spontaneously hydrolyzes in air and polymerizes as explained in the Rochow publication, mentioned above. Thereafter, the aerogel is incorporated into the oil, care being taken not to add too much silicone polymer to the gel. The quantity of waterproofing material added to the gel should be not less than 0.1% nor more than about 4%, usually not more than 3%, based on the weight of the final product.

Polymerized organo-siloxanes, such as alkyl-siloxanes, are added in proportions of about 2% by weight, based on the finished grease, to the lubricating oil, prior to the incorporation of the silica gel. These may also be added to the solvent-exchange gel, prior to incorporation of the oil, first replacing the water by means of a mutual solvent such as acetone. In either case the finished product has excellent water resistance.

The addition of small amounts of water, to the materials of any of the examples described above, substantially increases the yield value or thickening effect of the waterproofed gel. The water content, as previously indicated, should be within the range of 0.1 to 3%, preferably 0.25 to about 2.0%, based on the weight of the finished product.

Where the waterproofing material is added with the oil, or after the oil and gel have been combined, it is desirable to pass the grease through a colloid mill to improve dispersion of the oil insoluble waterproofing polymer.

The characteristics of the waterproofing organo-silicon polymer should be such that it is, after baking, substantially insoluble in either oil or water, though dispersible in oil. The polymer preferably is of multi-dimensional rather than linear type.

It will be understood from the foregoing that the essence of the present invention is the application to silica base greases of synthetic resin materials for the purpose of waterproofing the silica gel so that when a grease is prepared by replacing the normal water content of the gel with a lubricating oil, accidental contact with moisture will not result in replacement of the oil. By the use of synthetic resins of the siloxane, silicane, or silicone type, such as those derived from amino-silanes, alkyl silicone chlorides and various siloxanes or siloxane-forming compounds, the grease may be suitably waterproofed.

It will be understood that grease compositions made according to this invention may also include conventional additives such as extreme pressure agents, corrosion and oxidation inhibitors, tackiness agents, anti-rust ingredients and the like as will be understood by those skilled in the art.

What is claimed is:

1. A lubricating grease composition consisting essentially of about 89% by weight mineral base lubricating oil, 10% of silica aerogel, 1% of a hydrolyzed and polymerized amino-silane to substantially waterproof said silica gel, and 0 to 0.25% of water.

2. A lubricating grease consisting predominantly of mineral base lubricating oil thickened to a grease consistency with silica gel which has its normal water content replaced by said oil, said gel being waterproofed by 10 to 100% by weight, based on the dry weight of the gel, of an organo silicon polymer of general formula

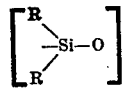

where R is alkyl or alkoxy.

AURELIO F. SIRIANNI.
IRA E. PUDDINGTON.

REFERENCES CITED

The following references are of record in the file of this patent:

UNITED STATES PATENTS

| Number | Name | Date |
| --- | --- | --- |
| 2,260,625 | Kistler | Oct. 28, 1941 |